Oct. 12, 1948.  G. M. THYNELL  2,451,129
TELEMETERING APPARATUS OF THE IMPULSE-DURATION CLASS
Filed March 31, 1944  2 Sheets-Sheet 1
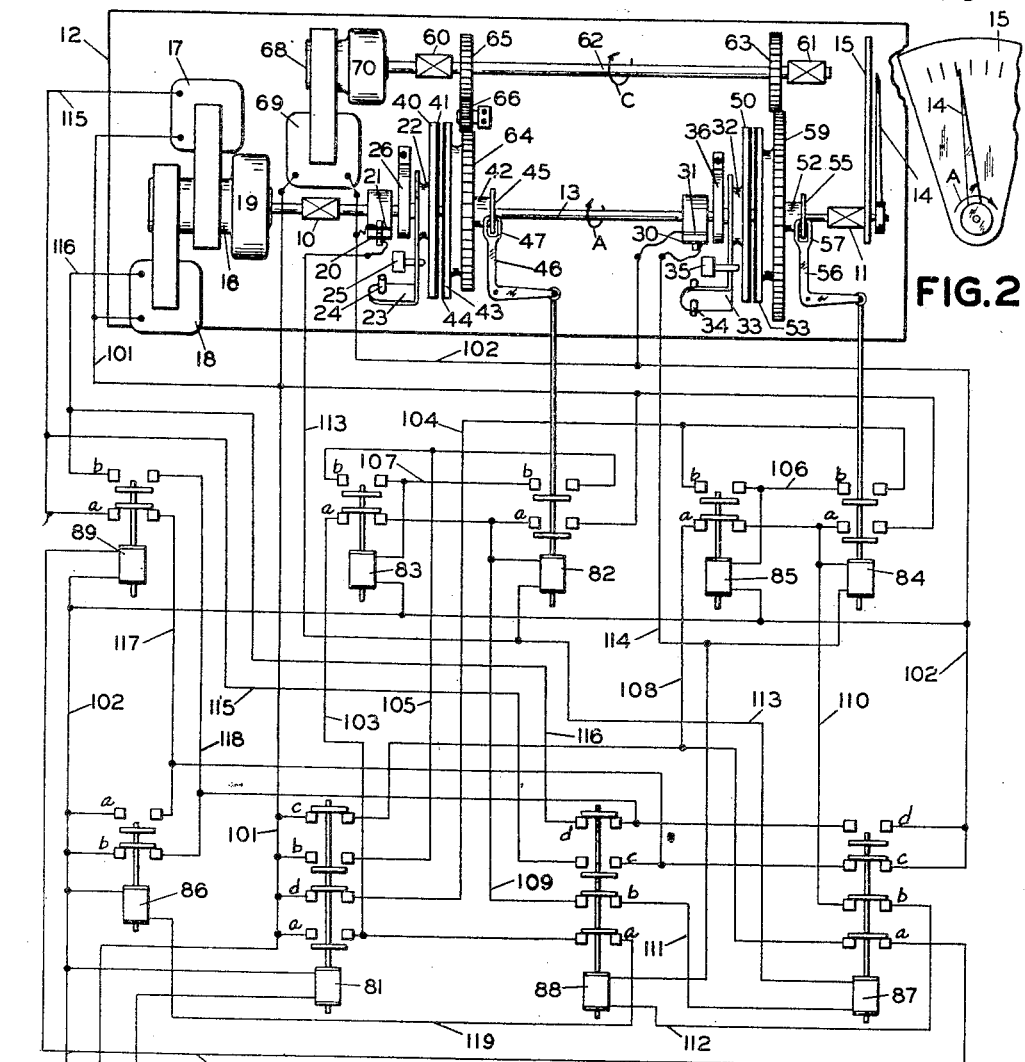
FIG. 2
FIG. 1
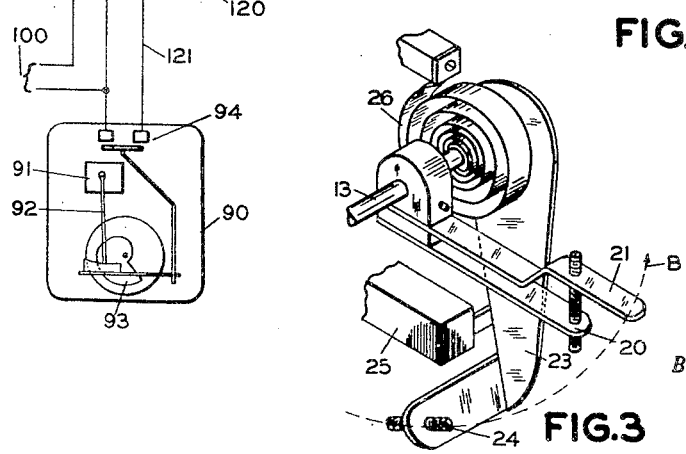
FIG. 3
INVENTOR.
Gustave M. Thynell
BY
E. C. Sanborn
Attorney

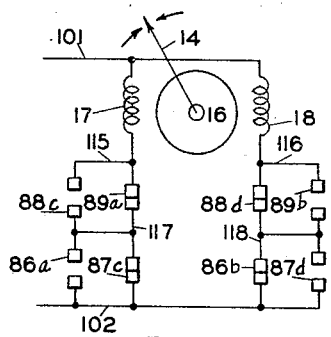
FIG. 4
| WINDING | COLUMN | | | | | | | |
|---|---|---|---|---|---|---|---|---|
| | I | II | III | IV | V | VI | VII | VIII |
| 81 | E | D | D | D | E | E | D | E |
| 82 | E | E | D | D | E | D | D | E |
| 83 | E | D | D | D | E | E | D | E |
| 84 | D | E | E | D | D | D | E | E |
| 85 | D | E | E | E | D | D | E | D |
| 86 | E | D | D | D | E | E | D | D |
| 87 | E | E | D | D | E | D | D | D |
| 88 | D | D | E | D | D | D | E | E |
| 89 | D | D | E | E | D | D | E | D |
| 17 | E | D | E | D | E | E | E | E |
| 18 | E | E | E | E | E | D | E | D |
| FIG. NO. | 5 | 6 | 7 | 8 | 5 | 9 | 7 | 10 |
E = ENERGIZED    D = DE-ENERGIZED
FIG. 11
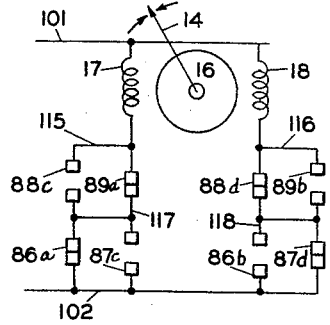
FIG. 5
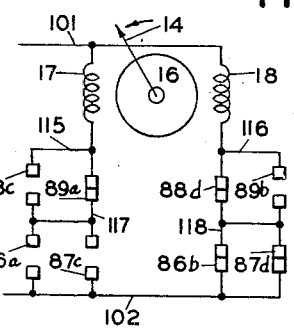
FIG. 6
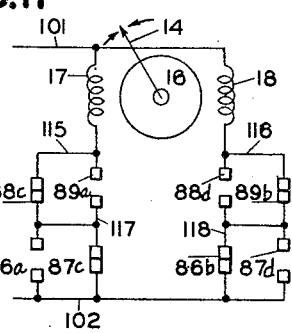
FIG. 7
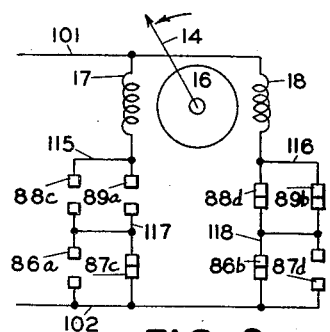
FIG. 8
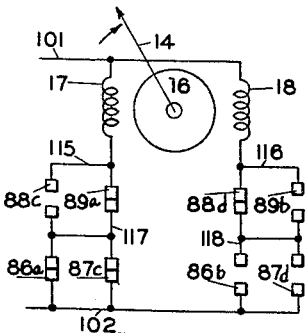
FIG. 9
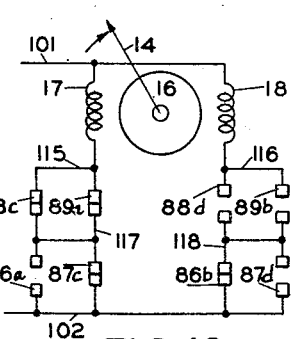
FIG. 10
*INVENTOR.*
Gustave M. Thynell
BY
E. C. Sanborn
*Attorney*

Patented Oct. 12, 1948

2,451,129

UNITED STATES PATENT OFFICE 2,451,129

TELEMETERING APPARATUS OF THE IMPULSE-DURATION CLASS

Gustave M. Thynell, Naugatuck, Conn., assignor to The Bristol Company, Waterbury, Conn., a corporation of Connecticut Application March 31, 1944, Serial No. 528,846

5 Claims. (Cl. 177—351)

This invention relates to telemetric apparatus, and more especially to a receiving instrument adapted for use in telemetering installations operating upon the "impulse-duration" principle of communicating signals to a conveniently located receiving instrument from a transmitting instrument at a remote point. While there are recognized a number of different systems of carrying out electrical telemetering, the method whose operation is based upon the transmission of impulses through an electrical circuit or channel is recognized as having many advantages. Since the required intelligence is transmitted through the medium of discrete impulses, and the only variable which is recognized by the receiving instrument is that of the time relation existing among said impulses, the circuit or channel may be of the type suited for simple telegraphy, and need not be provided with the refinements which are necessary for a circuit or channel such as is used for speech communication or other purposes where there is required a precise modulation of the transmitted electrical magnitude.

The class of telemetering systems to which the present invention is especially applicable is that group known as the impulse-duration type; and the basic principles of this group are well shown in U. S. Letters Patent No. 1,822,683, granted to K. Wilde, September 9, 1931, and reissued as No. 19,039, January 2, 1934. In telemetering systems of this class impulses of variable duration are cyclically established in a telemetering circuit or channel. One end of each of the successive impulses may be established at a uniform interval in each of a series of succeeding cycles determined by isochronous action of the transmitting instrument, and the other end of each impulse is made to occur at an instant in the cycle depending upon the magnitude of the measured variable. Telemetering systems of the impulse-duration group are widely used; and in the most commonly employed forms means are provided in the receiving instrument for translating the duration of the received impulse into a deflection of an exhibiting device, first in one direction and then in the opposite direction with reference to a graduated scale. An example of a receiving instrument especially suited to this method of telemetering is found in U. S. Letters Patent No. 2,040,918 granted to C. W. Bristol, May 19, 1936; and an example of a transmitting instrument suited to use with said receiving instrument and with telemetering systems of the impulse principle in general is found in U. S. Letters Patent No. 2,214,159 granted to F. B. Bristol, September 10, 1940.

While telemetering systems of the impulse type in which the positioning of the receiving element is determined solely by the duration of each impulse transmitted through the interconnecting circuit are capable of a high degree of precision, yet the function of positioning of the pointer or index of the instrument is carried out for only a relatively short portion of the cycle of operation, and during the remainder of the cycle this function is lost and the positioning mechanism may be said to be inert.

It is an object of the present invention to provide in telemetering systems of the impulse-duration class a receiving instrument which in comparison with previous types, will act for a greater part of each cycle to perform its function of positioning the indicating or recording pointer.

It is a further object to provide an instrument of the above class in which the shifting of the pointer from one position to another will be carried out in response to increments or changes in the durations of successive impulses, rather than to the actual durations of said impulses.

It is a further object to provide, for use in conjunction with a transmitting telemetering instrument adapted solely to define the durations of successive cyclical impulses in correspondence with successive values of a measured variable and to transmit said impulses over a two-conductor circuit, a receiving instrument incorporating in a single unit both the function of response to said impulses and also of response to increments between impulses in successive cycles.

It is a further object to provide a receiving instrument of the above class in which the positioning means shall be equally active in both directions and will respond both to changes in intervals during which an electrical impulse is impressed upon the receiving mechanism and intervals in which no impulse is being received from the transmitting circuit.

It is a further object to provide a receiving instrument of the above class in which the positioning action taking place in each cycle of operation shall take cognizance of the position in which the index, pointer, or other exhibiting member, was left by the effect of impulses occurring in previous cycles of operation.

It is a further object to provide a telemetering system in which the above-enumerated objects shall not be vitiated nor the ultimate accuracy destroyed by lack of synchronism between corresponding, alternating or periodic phenomena in the transmitting and receiving instruments.

In carrying out the purposes of the invention, it is proposed to provide a receiving mechanism having two sources of power therein, one being a continuously operating motor adapted to actuate either of two timing elements whereby there are developed time intervals to be compared with similar intervals transmitted from a remotely located measuring instrument, and the other a reversible motor adapted to position an index or pointer through increments whose durations are determined on the basis of said comparison.

In the drawings:

Fig. 1 is a diagrammatic representation of a telemetering receiver embodying the principles of the invention, and showing both the mechanical elements and the electrical relays and circuits by which various combinations of connections are set up in order to effect performance of the apparatus.

Fig. 2 is an end elevation of the pointer and scale forming elements of the device shown in Fig. 1.

Fig. 3 is a perspective view of certain details of the mechanism of Fig. 1.

Figs. 4 to 10 inclusive are schematic representations of various contact combinations in the reversible motor circuits, the appended arrows indicating the corresponding rotation tendencies.

Fig. 11 is a tabulation indicating the energized or de-energized conditions of certain electric windings forming elements of the invention.

Referring now to the drawing:

Journaled in bearings 10 and 11 upon a base plate 12 is an extended shaft member 13 adapted for rotation through a limited angle about its axis and carrying an extended pointer or index 14, which, in cooperation with a graduated, stationary scale 15, provides a measure of the angular position of said shaft. A reversible motor 16, preferably of the synchronous clock type, and having two windings 17 and 18 whose respective energization from a suitable source of electric power will determine the direction of rotation, is operatively connected to the shaft 13, as by a gear train 19. The arrangement of the motor windings is such that energization of the winding 17 will cause the shaft 13 to be rotated in a clockwise direction as seen in Fig. 2, and as indicated by the arrow A in Fig. 1, while energization of the winding 18 will cause the shaft to be rotated in the reverse direction. The angular velocity being the same, in either direction rotation.

Mounted upon the shaft 13 and rotatable therewith is a contact assembly having two mutually insulated spring-engaged contact members 20 and 21 (more clearly shown in Fig. 3), the latter projecting for engagement whereby upon the application thereto of a force in a direction corresponding to clockwise rotation of the shaft 13, said contacts will be separated, with resultant opening of an electrical circuit therebetween. Also carried by the shaft 13, but freely rotatable with respect thereto, is a hub member 22 having a radially extending arm 23 carrying a tappet screw 24, said arm normally being urged toward, and retained in engagement with, a fixed stop 25 by means of a resilient spring 26, but adapted, when rotated about the axis of the shaft 13 in a sense corresponding to the arrow B in Fig. 3, to carry the tappet screw 24 in engagement with the contact member 21, causing the contacts 20—21 to be separated.

Mounted upon the shaft 13 and rotatable therewith is a contact assembly having two mutually insulated spring-engaged contact members 30—31, similar in all respects to the members 20 and 21 as shown in Fig. 3, and normally in engagement, but adapted for operation upon the application to the contact 31 of a pressure in a sense corresponding to the counter-clockwise rotation about the axis of the shaft 13. Also carried by the shaft 13 and freely rotatable with respect thereto is a hub member 32 having a radially extended arm 33 carrying a tappet screw 34, said arm normally being urged toward, and retained in engagement with a fixed stop 35 by means of a resilient spring 36, but adapted, when rotated about the axis of the shaft 13 in a sense opposed to the arrow A, to carry the tappet screw into engagement with the contact 31 causing the contacts 30—31 to be separated.

Attached to the hub member 22 is a clutch element consisting of a flat plate 40 having thereon a facing of friction material 41 such as sheet cork or rubber. Carried by the shaft 13 and freely rotatable with respect thereto and also free for limited axial translation thereon, is a further clutch element including a hub member 42 carrying a flat plate 43 having a facing of friction material 44 juxtaposed to the friction facing of the plate 40. Attached to the hub member 42 is a flange 45 engaged by a rockable bell-crank 46 pivotally mounted upon the base plate 12 and having a bifurcated extremity 47 whereby, upon angular displacement of the bell-crank 46 about its pivotal mounting the hub member 42 and parts carried thereby will be axially displaced along the shaft 13, bringing the friction surfaces of the respective clutch elements into engagement, rendering said elements rotatable as an integral unit.

Attached to the hub member 32 is a clutch element consisting of a flat plate 50 having thereon a facing of friction material similar to that on the plate 40. Carried by the shaft 13, and freely rotatable and translatable with respect thereto, is a further clutch element including a hub member 52 carrying a flat plate 53 having a facing of friction material juxtaposed to the similar facing of the plate 50. Attached to the hub member 52 is a flange 55 engaged by a rockable bell-crank 56 pivotally mounted upon the base plate 12 and having a bifurcated extremity 57 whereby, upon angular displacement of the bell-crank 56 about its pivotal mounting, the friction surfaces of the respective clutch elements will be brought into engagement, rendering said elements rotatable as an integral unit.

Fixed to the hub member 52 is a gear 59 adapted to rotate said hub member together with clutch element 53 carried thereby upon the shaft 13, and also to be translated through a short distance axially of said shaft as said hub member is moved by operation of the bell-crank 56. Journaled in bearings 60 and 61 is a shaft 62 disposed parallel to the shaft 13, and having fixed thereto a gear member 63 meshing with the gear member 59, whereby rotation of the shaft 62 will be imparted to the hub member 52 and parts carried thereby. Fixed to the hub member 42 is a gear member 64; and a gear 65 is attached to the shaft 62 in alignment with the gear 64. The gears 64 and 65 are cooperatively engaged by means of an idler 66 pivotly mounted upon the base plate 12 and meshing with both said gears, whereby rotation of the shaft 62 will cause the hub 42 and parts carried thereby to be rotated in the same direction as said shaft.

A motor 68, having an operating winding 69, and acting through a gear train 70, causes the shaft 62 to be continuously rotated at a constant velocity, so that the clutch elements carried by the hub members 42 and 52 respectively will be rotated in opposite directions. The ratios of the several gear members are so selected that the rotary motions imparted to the hub members 42 and 52, while opposite in sense, will have equal angular velocities, preferably, though, as will hereinafter be set forth, not necessarily, the same as the angular velocity imparted to the shaft 13 by operation of the motor 16.

Associated with the mechanism on the baseplate 12, in a manner presently to be explained, are nine relays, each having an actuating winding, and with contact arrangements which may be designated as follows:

A relay 81 is provided with four sets of contacts 81a and 81b normally open, and 81c and 81d normally closed.

A relay 82 is provided with two sets of contacts 82a and 82b, both normally open.

A relay 83 is provided with contacts 83a normally closed, and 83b normally open.

A relay 84 is provided with two sets of contacts 84a and 84b both normally open.

A relay 85 is provided with contacts 85a normally closed and 85b normally open.

A relay 86 is provided with contacts 86a normally open and 86b normally closed.

A relay 87 is provided with contacts 87a, 87b, and 87c normally closed, and 87d normally open.

A relay 88 is provided with contacts 88a and 88b normally closed, 88c normally open, and 88d normally closed.

A relay 89 is provided with contacts 89a normally closed and 89b normally open.

In addition to the electrical contact members above set forth, the relays 82 and 84 are mechanically linked to the bell-cranks 46 and 56 respectively, so that energization of the winding of the former relay will actuate the bell-crank 46 in a sense to translate the hub 42 and parts carried thereby along the shaft 13, causing the friction surfaces of the associated clutch elements to be engaged, whereby rotary motion imparted to the gear member 64 will be imparted to the tappet arm 23, and energization of the winding of the latter relay will similarly cause the clutch elements associated with the hub member 52 to be engaged, and motion of the gear 59 to be imparted to the tappet arm 33.

Associated with the elements hereinbefore set forth, and adapted to function as a source of impulses for operating the same, is a transmitting instrument 90 preferably of the class fully set forth and described in U. S. Letters Patent No. 2,214,159 granted September 10, 1940 to F. B. Bristol. This instrument comprises a measuring element 91 having a deflectable arm 92 adapted to excurse across the face of a continuously rotating spiral plate 93 and to be periodically engaged and released thereby, thus causing a contact member 94 to be actuated and to establish cyclically recurrent time intervals whose successive durations will be representative of successive values of the magnitude measured by the element 91. As the principle and construction of the impulse-generating instrument is fully described in said F. B. Bristol's patent, and as said instrument is taken only as an example of that general class of telemetering transmitters operating on the "impulse-duration" principle, it will not here be necessary to describe the device in further detail.

While to those conversant with the art of electrical control, it will be obvious that the various elements of the apparatus may be energized from more or less independent electrical sources, they are hereinafter for purposes of simplicity described as all receiving electric power from a common source 100, as represented by a two-wire circuit having individual conductors or buses 101 and 102, between which is maintained an electrical potential of voltage and frequency to the utilization of which all the electro-responsive elements of the apparatus are adapted. To the conductor 101 is connected one side of each of the motor windings 17, 18, and 69, and one side of each of the relay contacts 81a, 81b, 81c, 81d, 82a, and 84a, as well as one side of the contacts 94 in the instrument 90. To the conductor 102 are connected one side of each of the actuating windings of relays 81, 83, 85, 86, and 89, the mechanically actuated contact members 21 and 31; one side of each of the relay contacts 86a, 86b, 87c, and 87d, and also the free terminals of the motor winding 69.

A conductor 103 provides interconnection between the free terminal of the relay contacts 81a, and one side of each of the contacts 83a and 88a; and a conductor 104 similarly provides interconnection between the free terminals of the relay contacts 81d and one side of each of the contacts 84b and 85b, the free terminals of said last-named contacts and of the winding of relay 85 being interconnected by means of a conductor 106.

A conductor 105 provides interconnection between the free terminals of relay contacts 81b and one side of the contacts 82b and 83b, the free terminals of said last-named contacts and of the winding of the relay 83 being interconnected by means of a conductor 107. A conductor 108 provides interconnection between the free terminal of the relay contacts 81c and one side of each of the contacts 85a and 87a. A conductor 109 provides interconnection between the free terminals of contacts 82a and 83a and one side of the relay winding 82 and of the relay contacts 88b. A conductor 110 provides interconnection between the free terminals of relay contacts 84a and 85a and one side of the relay winding 84 and the relay contacts 87b. The free terminals of relay contact 88b and one side of the actuating winding of relay 87 are interconnected by means of a conductor 111; and the free terminals of relay contact 87b and one side of the winding of relay 88 are similarly interconnected by means of a conductor 112. A conductor 113 provides interconnection between mechanically actuated contact member 20 and the free terminals of the windings of relays 82 and 87; and a conductor 114 similarly provides interconnection between the mechanically actuated contact member 30 and the free terminals of the windings of relays 84 and 88.

A conductor 115 provides interconnection between the free terminal of the winding 17 of the motor 16 and one side of each of the relay contacts 88c and 89a; and a conductor 116 similarly provides connection between the free terminal of the winding 18 of said motor and one side of each of the contacts 88d and 89b. A conductor 117 provides interconnection between the free terminals of contacts 86a, 87c, 88c, and 89a; and a conductor 118 similarly provides interconnection between the free terminals of contacts 86b, 87d, 88d and 89b. A conductor 119 provides connection between the free terminal of contact 88a and of the winding of relay 86; and a conductor 120 similarly provides connection between the free terminal of contact 87a and of the winding of relay 89.

In Figs. 4 to 10, inclusive, are diagrammatically indicated the positions of relay contacts directly in the motor circuits and corresponding to various conditions presently to be set forth. As will be made clear in the course of the explanation, there can at no time exist an operating condition in which all relays are de-energized. Fig. 4, therefore, which represents the contact combination under such a condition, is provided merely as a basis of reference in studying the combinations shown in the figures which follow.

A conductor 121 provides connection between the free terminal of the winding of the relay 81 and that of the contact member 94 in the transmitting instrument 90. In the application of the invention to the practice of telemetering, where the transmitting instrument 90 will be located at a point of measurement remote from the receiving apparatus, the conductor 121, in conjunction with that portion of the line conductor 101 which is connected to the contact member 94, will serve as a two-wire channel, through which impulses originating with the contact member 94 may be transmitted to the receiving mechanism.

For the purpose of explaining the operation of the invention, it may be assumed that the shaft 13 and parts carried thereby occupy a position of rest with the pointer 14 intermediate the extremities of the scale 15 and having an excursion representing the resultant of previously imparted impulses; and that the spiral plate 93 of the transmitting instrument is in rotation at a uniform velocity, engaging and disengaging the arm 92 to close and open the contact member 94 cyclically, and that the connection is such that an increasing value of the magnitude measured by the element 91 will tend to increase the proportion of the operating cycle during which the contact member 94 is in a closed condition, and vice versa. Assuming now, that the source 100 is energized, making the conductors 101 and 102 the two sides of an electrical circuit; consideration may be given to conditions developing with such energization first taking place with the contact member 94 in closed position.

Both sides of the circuit, as represented by the conductors 101 and 102, being connected to the winding 69 of the motor 68, said motor will operate continuously, causing the shaft 62 to rotate in a direction as indicated by the arrow C, the gear 63 carried by said shaft coacting with the gear 59 to drive the same and the associated clutch member in an angular sense opposed to that indicated by the arrow A. At the same time, the gear 65 acting through the idler 66 will cause the gear 64 and its associated clutch element to be driven in the sense indicated by the arrow A.

Contact member 94 in the transmitting instrument being closed, the relay 81 will be energized, with its contacts 81a and 81b closed and 81c and 81d open. Contact 81a will provide a path between line conductor 101 and conductor 103, and thence through normally closed contacts 88a and the winding of relay 86 to line conductor 102, causing said last-named relay to be energized, closing contact 86a and opening contact 86b. Normally closed contact 83a will provide a path from conductor 103 to conductor 109, and thence through the winding of relay 82, conductor 113, mechanically-actuated contacts 20—21, to line conductor 102, thus causing the relay 82 to be energized, closing its contacts 82a and 82b, and incidentally actuating the bell-crank 46 to engage the friction faces of the clutch members 40 and 43, whereby the tappet arm 23 will immediately begin to rotate from its normal position of rest against the stop 25 in a direction indicated by arrow A. At the same time, the closing of the contact 82b will provide a path between the conductors 105 and 107 in parallel with the contact 83b. Connection between conductors 109 and 111 will be established by the normally closed contact 88b, whereby a path is provided through the winding of relay 87, conductor 113, contacts 20—21, to line conductor 102, thus causing relay 87 to be energized, opening its contacts 87a, 87b, and 87c and closing contact 87d. Relay contact 81b places line conductor 101 directly in connection with conductor 105. The now closed contact 86a provides connection between line conductor 102 and conductor 117, and thence through normally closed contact 89a to conductor 115 and the winding 17 of the motor 16 to line conductor 101, causing said motor to be energized in a sense tending to rotate the shaft 13 and the pointer 14 carried thereby in a direction indicated by the arrow A, such rotation, however, being inhibited by an opposing influence derived from the motor winding 18 in the following manner:

The relay 87 being energized, and its contact 87d closed, there is provided a path from line conductor 102 to conductor 118, through normally closed contact 88d to conductor 116, and thence through the winding 18 of the motor 16 to line conductor 101, causing said motor to be energized in a sense opposed to the influence of winding 17, thus stalling the motor with dynamic braking, and causing the shaft 13, and elements carried thereby to remain locked in a position of rest. This state of inhibition, corresponding to conditions shown in Fig. 5, and to column I in the tabulation of Fig. 11, will be maintained until either of two conditions is fulfilled, depending upon whether the contact 94 is maintained in a closed position for a shorter or a longer interval than that represented by the previous excursion of the shaft 13, and thus upon whether said contact 94 is opened before or after the tappet 23 has had time to reach the position occupied by the contact member 21.

Assuming that the value of the measured magnitude is less than that at the time of the preceding cycle as determined by the rotation of the spiral plate 93 in the instrument 90, and as represented by the excursed position of the shaft 13 and elements carried thereby, the contact 94 will be maintained in a closed condition for a shorter time than in said preceding cycle, opening before the tappet 23 in its excursion can reach the position occupied by the contact member 21, and causing the relay 81 to be de-energized, opening its contacts 81a and 81b and closing its contacts 81c and 81d. Since the contact 81a is shunted by contact 82a, its opening will have no immediate effect upon circuit conditions, other than to de-energize relay 86. Opening of contact 81b, however, will cause relay 83 to be de-energized, closing its contact 83a and opening its contact 83b. Closing of the contact 81c will establish a path from conductor 101 to conductor 108 through contact 85a to conductor 110, through the winding of relay 84 and the normally closed contact members 30—31 to conductor 102, whereby relay 84 will be energized, contacts 84a and 84b closed and the clutch elements 50 and 53 brought into engagement so that tappet arm 33 will at once leave its position of reset against the stop 35 and will begin to rotate about the shaft 13 in a sense opposed to the arrow A.

Contact 81d will establish a path from conductor 101 to conductor 104, and thence through contact 84b, conductor 106 and relay 85 to conductor 102, energizing said relay 85, which will open the contact 85a and at the same time lock in the relay through the shunting of contact 84b by contact 85b. The positions of the several relays will now be as indicated in column II of the tabulation, and the combination of contacts immediately associated with the circuits of the motor 16 will be as indicated in Fig. 6, the winding 18 being energized and the winding 17 de-energized, causing the motor to rotate the shaft 13 and the parts carried thereby in a sense opposed to the arrow A and to reduce the reading of the pointer or index 14 with respect to the scale 15. At the same time the contact assemblies 20—21 and 30—31 are being carried around by the shaft 13, and both tappet arms 23 and 33 are being rotated about the shaft 13, the former in opposition to, and the latter in the same direction as, the rotation of said shaft.

The mutual approach of contact member 21 and tappet 24 due to their rotations in opposite directions will tend to bring them into engagement; and since the contact 94 will remain open for a longer interval than in the preceding cycle, such engagement will take place, with resultant separation of the contacts 20—21, at a point intermediate the former position of the contact 21 and the position attained by the tappet 24 at the moment the contact 94 was opened and the shaft 13 started on its rotation. Separation of contacts 20—21 will open the circuit between them, thus de-energizing relay 82 and thereby opening its contacts 82a and 82b and also releasing the clutch elements 40—43 from mutual engagement, whereby the tappet arm 23 under the influence of spring 26 will immediately be reset to its normal position of rest against the stop 25. The opening of contacts 20—21 will also de-energize the relay 87, thus closing contacts 87a, 87b, and 87c and opening contact 87d. The closing of contact 87a will provide a path from conductor 108 to conductor 120 and thus through the winding of relay 89 to conductor 102 energizing said relay. The closing of contact 87b will provide a path from conductor 101 through the closed contact 84a and conductors 110—112 through the winding of relay 88 to conductor 114 and the normally closed contacts 31—32 to conductor 102, energizing relay 88. The positions of the several relays will now be as indicated in column III of the tabulation, and the combination of contacts immediately associated with the circuits of motor 16 will be as indicated in Fig. 7, so that said motor will be brought to rest with dynamic braking due to the opposed influences of windings 17 and 18.

The position in which the motor 16, with its driven shaft 13 and elements carried thereby is brought to rest will depend upon the duration of the impulse imparted thereto; and this will represent a time interval determined by the original position of the contact member 21 in the cycle of operation and by the delay of the starting of the tappet arm 23 from its rest position subsequent to the beginning of motion of the shaft 13. In other words, said interval will be determined in part by the time elapsing between closing and opening of the contact 94, and in part by the position assumed by the shaft 13 in the previous cycle of operation; and the pointer 14 will have tended to move down scale from its previous position a distance represented by the decrease in duration of the contact interval of the contact member 94 as compared with the interval representing the previously attained position of the pointer 14, which distance, of course, is in turn representative of the decrease in value of the measured magnitude below that determined in the previous cycle of operation.

The relay 84 being energized, and the tappet arm 33 advancing toward the position attained by the contact member 31, it is obvious that engagement between said contact member and the tappet 34 will, or will not, take place, according to whether the interval of open circuit at the contact 94 is longer or shorter than that required for said tappet arm to excurse from its position of rest against the stop 35 to the position occupied by the contact member 31.

If said contact member has not attained a position corresponding to the measured magnitude it will be engaged by the tappet 34 before the contact 94 in the instrument 90 is again closed. Immediately upon such engagement the contacts 31—30 will be separated, de-energizing the relay 84 and allowing the tappet arm 33 under the influence of the spring 36 to reset to its position of rest on the stop 35. While the release of relay 84 will open its contacts 84a and 84b, this will not affect the performance of the apparatus, as contact 84a is shunted by a path through contact 81c and associated conductors, and contact 84b is shunted by contact 85b. Separation of contacts 30—31 will, however, de-energize the relay 88, with the result that the several relays will now have assumed the positions indicated in column IV of the tabulation. The function of contact 85a, which is held open due to energization of the relay 85, is to interrupt the connection between conductor 108 and relay 84, whereby said relay 84 will not be re-energized by the closing of contacts 30—31 upon their release by the tappet 34. The arrangement of contacts directly associated with the motor circuits will now be as shown in Fig. 8, and the motor 16 will be operating in a sense to move the shaft 13 and elements carried thereby in a direction opposite to that indicated by the arrow A. This condition will continue until the contact 94 is again closed due to rotation of the spiral plate 93, whereupon relay 81 will be energized, de-energizing the circuits to relays 89 and 85, and re-establishing conditions as they were at the beginning of the cycle of operation, whereby the relays will assume the positions indicated in column V of the tabulations (which is identical with column I), and the motor 16 will be brought to rest with dynamic braking while the tappet arm 23 is advancing from its normal rest position.

It will be seen that during the cycle described, the indicating pointer 14 has received two distinct impulses representative of the change in the value of the measured magnitude from that determined during the previous cycle, the first of these impulses being determined by the excess of the deflection over the value of the measured quantity, and the second by the deficiency of the deflection as measured from the top of the scale as compared to the amount by which the measured magnitude falls short of the full-scale reading of the instrument. From the foregoing it will be seen that if the angular velocity of the tappet arms is the same as that of the shaft 13, a true indication of the value of a decreasing magnitude will be attained on the second half cycle of operation. If the angular velocity of the tappets is less than that of the shaft 13, then on a decreasing magnitude a relatively closer approach to the true indication will be attained on the first half cycle, and the instrument will overshoot into the low scale end on the second half cycle. Successive half cycles will find the instrument overshooting by the same percent as the amount of overshoot in the second half cycle but if the percentage overshoot is less than 100, the instrument will in successive half cycles approach the true reading—the actual deviation therefrom becoming smaller with each half cycle. If on the other hand, the angular velocity of the tappets is greater than that of the shaft 13, a relatively small approach to the true indication will be made on the first half cycle, and on the second half cycle the index will fall short of the true reading. In the succeeding half cycles of operation the tendency will be to correct any deviation thus developing, so that within several cycles, even though there be a discrepancy between said angular velocities, a correct reading will be obtained.

The operation of the device under conditions of increasing value of the measured quantity is in all respects similar to that set forth for decreasing values, and may be briefly outlined as follows: Assuming first that the contact 94, as before, closes at a definite and invariable point in the cycle of operation, there will be set up a combination of relays corresponding to column I of the tabulation in Fig. 11, and of the motor control contacts as shown in Fig. 5, whereby the motor 16 will be locked in a position of rest, with the tappet arm 23 approaching the contact member 21.

As the measured quantity has increased over the value determined in the previous cycle of operation, it follows that the contact 94 will be maintained in a closed position for a longer time than in said previous cycle, while the excursion of the tappet arm 23 necessary for the tappet 24 to engage the contact member 21 will occupy only a time corresponding to the previously established position of said contact member, with the result that the contacts 20—21 will be separated while the contact 94 remains closed.

Opening of the contacts 20—21 will de-energize relays 82 and 87, whereby the tappet arm 23 will be released and will reset to its stop. Contact 82a will be opened, but, being shunted by the circuit through contact 81a, will produce no immediate effect on operation. Similarly, the opening of contact 82b, which is shunted by contact 83b, will produce no immediate effect. The several relays will now have assumed positions indicated in column VI of the tabulations, and the motor control contacts will be as shown in Fig. 9, whereby the winding 18 is deenergized, and the motor, under the unopposed influence of winding 17 will cause the pointer 14 to be advanced in an up-scale direction.

After a further lapse of time corresponding to the increment of duration of the impulse established by the contact 94 over that determined by the previously attained setting of the contact member 21, the contact 94 will be opened, de-energizing the relay 81, opening its contacts 81a and 81b and closing its contacts 81c and 81d. Relays 86 and 83 will be de-energized. The closing of contact 81c will provide a current path through closed contact 87a to energize relay 89, and through contact 85a to energize relay 84, and also through contact 87b to energize relay 88. The closing of contact 81d will provide through contact 84b a current path to energize relay 85. The several relays will now have assumed the positions indicated in column VII of the tabulation, and the motor control contacts will be as shown in Fig. 7, wherein both windings 17 and 18 are energized and the motor 16 brought to rest with dynamic braking. As the interval of time during which the motor 16 was energized represents the increment of the measured quantity over its previously determined value, it will be obvious that the pointer 14 will have been advanced a corresponding distance along the scale 15, and will have approached an indication of the newly attained value.

At the same instant as the motor 16 was brought to rest, the engagement of the clutch elements 50—53, due to energization of the relay 84, will have started the tappet arm 33 advancing from its normal position of rest against the stop 35 to that occupied by the contact member 31. If, for any reason, such as acceleration characteristics of the motor 16 or delay in operation of relays, the pointer 14 has not fully attained a position corresponding to the true value of the measured magnitude as communicated by the impulse determined by the contact 94 in the transmitting instrument, the time interval required for the tappet arm 33 to travel to the position occupied by the contact element 31 will be greater than the interval between the opening of the contact 94 and its reclosing by engagement of the pointer-arm 92 with the leading edge of the plate 93, so that, as relay 81 is energized by closing of the contact 94, the contact elements 30—31 will still be in engagement, retaining relays 84 and 88 in an energized condition. Opening of relay contact 81c will deenergize relay 89, and opening of contact 81d will deenergize relay 85; but because relays 84 and 88 remain energized, this will have no immediate effect on circuit conditions. The several relays will now have assumed positions indicated in column VIII of the tabulation in Fig. 11, and the motor control contacts will be as shown in Fig. 10, wherein winding 18 of the motor 16 is deenergized, allowing the winding 17 to exert its influence without opposition, and further advance the pointer 14 toward a position representing the true value of the measured quantity.

Energization of the relay 81 will have caused the relay 82 to be energized, whereby tappet arm 23 will have started to excurse; but because of contacts 88a and 88b being open, due to energization of relay 88, this part of the circuit will have no present effect on performance of the motor 16. The contact assembly 30—31, carried by the shaft 13 will have started to excurse with said shaft in a sense to meet the tappet arm 33 which will still be approaching the position held by the contact element 31 at the conclusion of the previous setting impulse. As the tappet 34 engages the contact element 31, momentarily separating it from the contact element 30, the relay 84 will be de-energized, opening its contacts 84a and 84b, causing the tappet arm 33 to reset to its normal position of rest. At the same time, relay 88 is de-energized, thus closing its contacts 88a and 88b, and energizing relays 86 and 87, whereby the several relays in the system will have reverted to the conditions in column I of the tabulation, and the motor control contacts to the arrangement shown in Fig. 5, bringing the motor to rest with dynamic braking, and establishing conditions for a succeeding cycle, which was actually initiated at the moment the tappet arm 23 began its excursion in response to energization of the relay 82 when the contact 94 in the transmitting instrument 90 was closed by engagement of the arm 92 with the leading edge of the spiral plate 93.

For an increasing value of the measured quantity, the characteristic operation of the apparatus with respect to relative velocities of the shaft 13 and the tappet arms will be similar to that described in connection with a decreasing value. If the angular velocities are equal, a true indication of the measured magnitude will be obtained on the first half cycle of operation. If the velocity of the shaft 13 is greater than that of the tappets, the instrument will overshoot on the first half cycle, and on the second half cycle will also overshoot but in reverse direction by a proportion equal to that of the overshoot on the first half cycle. If the overshoot is less than 100% the instrument will in successive half cycles approach the point of balance—the deviation becoming smaller with each half cycle. If on the other hand, the speed of the shaft 13 is less than that of the tappets, the instrument will approach true indication on the first half cycle and in successive half cycles will continue to approach true indication until equilibrium is reached. It will thus be obvious that lack of synchronism between the motors in the transmitting and the receiving instruments will have no ultimate effect upon the accuracy of the readings of the latter instrument with respect to measurements performed by the former.

The terms and expressions which I have employed are used as terms of description and not of limitation, and I have no intention, in the use of such terms and expressions of excluding any equivalents of the features shown and described or portions thereof, but recognize that various modifications are possible within the scope of the invention claimed.

I claim:

1. In a telemetric receiver adapted to respond to cyclically transmitted electrical impulses each of a duration corresponding to a value of a variable, the combination of an element settable to positions corresponding to values of said variable, clutch means, continuously operable motor means, means for engaging said clutch means with said motor means in response to the beginning of an impulse for effecting operation of said clutch means in a given direction, other clutch means, means for engaging said other clutch means and said motor means in response to termination of said impulse for effecting operation of said other clutch means in the opposite direction, contact means controlled by the respective clutch means, and reversible motor means controlled by said contact means for positioning said element.

2. In a telemetric receiving instrument adapted to respond to cyclically recurrent impulses corresponding to values of a variable, the combination of a rotatable shaft, an element rotatable with said shaft to positions representative of values of said variable, a reversible motor operatively connected to said shaft and adapted to position the same, contact members carried by said shaft and movable therewith, contact actuating members carried by said shaft and freely rotatable thereon and adapted to cooperate respectively with said contact members, spring means asosciated with said contact actuating members to urge the same in opposite angular senses respectively and normally maintaining them against fixed stops, independently operable clutch means for impelling said contact actuating members about said shaft in directions opposed to the influences of their respectively associated spring means, means for actuating said clutch means in response to said cyclically recurrent impulses, and means to render said clutch means inactive upon coaction of respectively driven contact actuating members with corresponding cooperating shaft-carried contact members together with means responsive to said impulses and rendering said reversible motor operative and means responsive to the coaction of said contact actuating members and said contact members for rendering said motor inoperative.

3. In a telemetric receiving instrument adapted to respond differentially to the initiations and the terminations of cyclically recurrent electrical impulses corresponding to values of a variable, the combination of a rotatable shaft, an element rotatable with said shaft to positions representative of values of said variable, a reversible electric motor operatively connected to said shaft and adapted to position the same, two contact members carried by said shaft and movable therewith, two contact actuating members carried by said shaft and freely rotatable thereon and adapted to cooperate respectively with said contact members in controlling an electric circuit, spring means associated with said contact actuating members to urge the same in opposite angular senses respectively and normally maintaining them against fixed stops, independently operable clutch means for impelling said contact actuating members about said shaft in directions opposed to the influences of their respectively associated spring means, electromagnetic means responsive to the initiations of said impulses and actuating one of said clutch means for impelling a corresponding one of said contact actuating members about said shaft in a direction opposed to the influence of the associated spring means, electromagnetic means responsive to terminations of said impulses for similarly actuating the other of said clutch means, and means responsive to conditions in said electric circuit for deenergizing said electromagnetic means and thereby rendering said clutch means inactive upon engagement of a respectively driven contact actuating member with the corresponding cooperating shaft-carried contact member, together with separate relay means responsive to the initiations and terminations of said impulses to render said motor operative in corresponding directions, and other relay means responsive to the engagement of said contact actuating member with the corresponding contact member for rendering said motor inoperative.

4. In a telemetric receiver adapted to respond to cyclically transmitted electrical impulses defining in each cycle a time interval corresponding to a value of a variable, the combination of an element settable to positions corresponding to values of said variable, relay means responsive to said impulses and energized in each cycle for a time duration corresponding to the value transmitted during said cycle, reversible motor means for positioning said element, contact means movable with said element, means for actuating said contact means, other contact means movable with said element, means for actuating said other contact means, a relay brought into action by operation of said relay means at the beginning of said interval for causing the first mentioned actuating means to actuate the first mentioned contact means at the end of an interval dependent upon the position of said element, another relay brought into action by operation of said relay means at the end of said interval for causing the second mentioned actuating means to actuate the second mentioned contact means at the end of an interval dependent upon the position of said element, and relays controlled by the aforementioned relays for controlling said reversible motor.

5. In a telemetric receiver adapted to respond to cyclically transmitted electrical impulses defining in each cycle a time interval corresponding to a value of a variable, the combination of an element settable to positions corresponding to values of said variable, relay means responsive to said impulses and energized in each cycle for a time duration corresponding to the value transmitted during said cycle, reversible motor means for positioning said element, contact means movable with said element, means for actuating said contact means, other contact means movable with said element, means for actuating said other contact means, a relay brought into action by operation of said relay means at the beginning of said interval for causing the first mentioned actuating means to actuate the first mentioned contact means at the end of an interval dependent upon the position of said element, another relay brought into action by operation of said relay means at the end of said interval for causing the second mentioned actuating means to actuate the second mentioned contact means at the end of an interval dependent upon the position of said element, and relays controlled by the aforementioned relays for controlling said reversible motor, the last mentioned relays comprising relays energized concurrently with the first mentioned relays, and other relays controlled by contacts of said concurrently energized relays.

GUSTAVE M. THYNELL.

REFERENCES CITED

The following references are of record in the file of this patent:

UNITED STATES PATENTS

| Number | Name | Date |
| --- | --- | --- |
| 2,081,413 | Thompson | May 25, 1937 |
| 2,136,809 | Uehling | Nov. 15, 1938 |
| 2,232,589 | Chappell | Feb. 18, 1941 |
| 2,326,880 | Norrman | Aug. 17, 1943 |
| 2,361,703 | Orlich | Oct. 31, 1944 |
| 2,371,415 | Tolson | Mar. 13, 1945 |
| 2,384,766 | Orlich | Sept. 11, 1945 |